United States Patent [19]

Preston et al.

[11] 4,153,643
[45] May 8, 1979

[54] GRAFT COPOLYMERS FROM UNSATURATED MONOMERS AND PEROXY DI-ESTER POLYOLS AND POLYURETHANES PREPARED THEREFROM

[75] Inventors: Frank J. Preston, Meriden; Theodore C. Kraus, Cheshire; Kiran B. Chandalia, Hamden, all of Conn.

[73] Assignee: Olin Corporation, New Haven, Conn.

[21] Appl. No.: 843,104

[22] Filed: Oct. 18, 1977

[51] Int. Cl.² .............................................. C08L 25/04
[52] U.S. Cl. ................................ 260/861; 260/873; 260/874
[58] Field of Search ..................... 260/861, 873, 874

[56] References Cited

U.S. PATENT DOCUMENTS

| 3,383,351 | 5/1968 | Stamberger | 260/33.2 R |
| 3,652,639 | 3/1972 | Pizzini et al. | 260/874 |
| 3,752,802 | 8/1973 | Sheppard et al. | 260/873 |
| 3,823,201 | 7/1974 | Pizzini et al. | 260/861 |
| 3,932,562 | 1/1976 | Takahashi | 260/873 |

*Primary Examiner*—M. J. Welsh
*Attorney, Agent, or Firm*—Robert J. Feltovic; Thomas P. O'Day

[57] ABSTRACT

Graft copolymers are prepared by the polymerization of an ethylenically unsaturated monomer, or a mixture of such monomers, in the presence of a peroxy di-ester polyol. Presence of the peroxy group in the polyol reactant itself serves as a free radical initiator site for the graft copolymerization reaction. The copolymers formed are utilized in the formulation of polyurethane compositions.

22 Claims, No Drawings

GRAFT COPOLYMERS FROM UNSATURATED MONOMERS AND PEROXY DI-ESTER POLYOLS AND POLYURETHANES PREPARED THEREFROM

A great deal of art has arisen focusing on methods for increasing the overall molecular weight of polyols without seriously affecting chain length and attendant fluidity, by incorporating polymeric materials onto the polyol by grafting. Such grafted copolymer polyol dispersions have proven to be advantageous when used in polyurethane formulations to achieve desirable polyurethane product properties, such as enhanced load bearing and resiliency in foams.

It is known in the art to prepare graft copolymer dispersions from vinyl monomers and polyols and to use these copolymers in the formulation of urethane polymers. For example, U.S. Pat. No. 3,383,351 to Stamberger teaches that ethylenically unsaturated monomers may be polymerized in a polyol medium. As evidenced by Pizzini et al in U.S. Pat. No. 3,823,201, graft copolymers could also be formed by reacting vinyl monomers in polyols containing some degree of unsaturation. An effective amount of free radical catalyst is required in order to initiate these copolymerization reactions. Such free radical-type vinyl polymerization catalysts are, for example, the peroxides, persulfates, perborates, azo compounds, etc.

It is also known in the art to prepare graft copolymers by treating polymerizable vinyl-type monomers with azo-containing polymers. This is illustrated in U.S. Pat. No. 3,752,802 to Sheppard et al, which shows azo-containing polymers reacted with suitable vinyl monomers under conditions where the azo-carbon linkage is decomposed into free radicals at a rate and temperature suitable for polymerizing the vinyl monomer. These graft copolymers are suggested to have utility as stabilizers of solutions of different homopolymers.

Co-pending application Ser. No. 779,968, filed Mar. 22, 1977, describes graft copolymers prepared by reacting unsaturated monomers with azo di-ester polyols, and polyurethanes prepared from these graft copolymers. The graft copolymerization discussed therein is accomplished by free radical formation within the azo di-ester polyols through decomposition of the azo-carbon linkages.

Now, an improvement has been developed whereby a novel graft copolymer is prepared by reacting a peroxy-containing polyol compound with an ethylenically unsaturated monomer. In the graft copolymerization reaction, the unsaturated monomer is polymerized in the presence of these peroxy polyols at a temperature sufficient to rupture the peroxy linkage. As a result, the polymerized vinyl compounds graft directly onto the polyol chain itself at the site of the ruptured linkage. The presence of the peroxy group in the polyol itself eliminates the need for an additional free radical catalyst.

Further, according to the invention, the copolymer polyols are used in the formulation of polyurethane compositions, wherein reaction with organic polyisocyanates is effected.

The graft copolymer polyols of the present invention can be prepared by reacting certain peroxy di-ester polyols with ethylenically unsaturated monomers. This graft copolymer-forming reaction can be exemplified by the following illustration using styrene as the monomer reactant and a peroxy-bis ester polyol prepared from glutaric acid peroxide and a polyether triol:

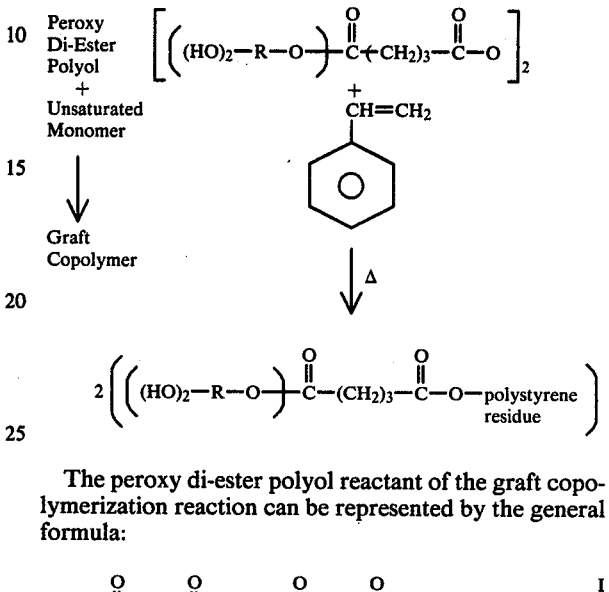

The peroxy di-ester polyol reactant of the graft copolymerization reaction can be represented by the general formula:

$$\left( (HO)_m - R_1 - O \right) - \overset{O}{\underset{\|}{C}} - R_2 - \overset{O}{\underset{\|}{C}} - O - O - \overset{O}{\underset{\|}{C}} - R_3 - \overset{O}{\underset{\|}{C}} - \left( O - R_4 - (OH)_r \right) \quad I$$

wherein m and r independently are integers from 1–5, $R_2$ and $R_3$ independently represent radicals selected from aryl and alkenyl of 2–5 carbon atoms, and the groups $((HO)_m-R_1-O)$ and $(O-R_4-(OH)_r)$ independently are residues of polyols $R_1(OH)_{m+1}$ and $R_4(OH)_{r+1}$, wherein $R_1$ and $R_4$ are independently selected from polyether or polyester chains, after removal of one hydroxy hydrogen therefrom.

These peroxy di-ester polyol compounds of the above formula include both symmetrical and non-symmetrical peroxy di-ester polyols. These peroxy compounds can be prepared by esterifying or transesterifying any suitable polyol or mixtures thereof, with a suitable peroxy diacid or a corresponding peroxy diacid ester.

Any peroxy diacid may be used. These non-cyclic diacyl peroxides of dibasic acids are properly named as carboxy-substituted diacyl peroxides. Typically preferred peroxy-bis diacids which may be used include succinic acid peroxide, glutaric acid peroxide, adipic acid peroxide, pimelic acid peroxide, suberic acid peroxide, phthalic acid peroxide and the like. The preferred peroxy-bis diacid is glutaric acid peroxide. The peroxy-bis diacid reactant commonly can be prepared by oxidation of suitable acid anhydrides with hydrogen peroxide, according to known procedures.

The polyol reactant which is used in preparing the peroxy di-ester polyols of the invention can be any such compound, including mixtures of two or more such compounds, having 2–6 hydroxyl groups and preferably an average equivalent weight from about 250 to about 5000. This includes polyester polyols and polyether polyols. However, the polyether polyols are generally preferred.

The polyester polyols include the products of reacting polycarboxylic acids with polyhydric alcohols. Illustrative polycarboxylic acids include, for example, oxalic, malonic, succinic, glutaric, adipic, pimelic, suberic, azelaic acid and the like. Illustrative polyhydric alcohols include various diols, triols, tetrols and higher-functionality alcohols, such as ethylene glycol, 1,3-propylene glycol, 1,2-propylene glycol, butylene glycols, butane diols, pentane diols, glycerol, trimethylolpropane, trimethylolhexane, pentaerythritol, sorbitol, hexane 1,2,6-triol, 2-methyl glucoside, mixtures thereof and the like. Aromatic type polyols such as Bisphenyl A may also be used.

The polyether polyols, the use of which is preferred herein, include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiators used in preparing the polyether polyol reactant can be any such material which has from 2 to 6 active hydrogens. This includes (a) aliphatic diols such as ethylene glycol, 1,3-propylene glycol, 1,2-propylene glycol, butylene glycols, butane diols, pentane diols, and the like, (b) the aliphatic triols such as glycerol, trimethylolpropane, triethylolpropane, trimethylolhexane, and the like, (c) higher-functionality alcohols such as sorbitol, pentaerythritol, methyl glucoside, and the like, (d) the polyamines such as tetraethylene diamine and (e) the alkanolamines such as diethanolamine, triethanolamine and the like.

A preferred group of polyhydric initiators for use in preparing the polyether polyol reactant is one which comprises aliphatic triols such as glycerol, trimethylolpropane and the like.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average equivalent weight of about 250–5000, preferably about 700–3000 and more preferably about 1000–1500. The catalyst is thereafter preferably removed, leaving a polyether polyol which is ready for use in preparing the peroxy di-ester polyols of the invention.

Symmetrical peroxy-bis ester polyols can be prepared by reacting a peroxy-bis diacid with a polyol. Unsymmetrical peroxy di-ester polyols also can readily be formulated by reacting an unsymmetrical peroxy diacid with a polyol or a mixture of polyols or by reacting a peroxy-bis diacid with a mixture of polyols. The peroxy-bis ester polyol reactants are preferred. The preparation of peroxy di-ester polyols and peroxy-bis ester polyols, suitable for use in the present invention, is detailed further in co-pending application, Ser. No. 843,103, which was filed concurrently herewith. The disclosure of this co-pending application is hereby incorporated in its entirety by reference.

In order to simplify the presentation herein, the peroxy-bis ester polyols have been selected to be discussed in more specific detail below. The principles presented are readily adaptable to unsymmetrical peroxy di-ester polyols. The symmetrical or peroxy-bis ester polyol reactant can be represented by the formula:

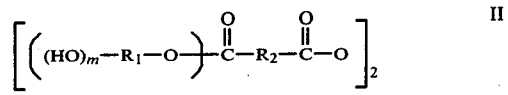

wherein m, $R_2$ and $((HO)_m-R_1-O)$ are as defined above in Formula I.

In order to form the graft copolymers of the present invention, the peroxy di-ester polyols are treated with an ethylenically unsaturated monomer or a mixture of such monomers, usually in the presence of additional polyol. The monomers useful in the copolymerization process are polymerizable monomers characterized by the presence of at least one polymerizable ethylenic unsaturated group of the type $>C=C<$. Any such monomer or mixture of monomers may be used.

Representative ethylenically unsaturated monomers which may be employed in the present invention include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexylacrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis (β-chloroethyl) vinyl phosphonate, vinyl phenyl ketone, vinyl ethyl sulfide, vinyl ethyl sulfone, N-methyl-N-vinyl acetamide, N-vinyl pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumerate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Preferred monomers include styrene, acrylonitrile, vinyl chloride, methyl methacrylate, hydroxy ethyl acrylate, butadiene, isoprene, chloroprene, and the like. Styrene and acrylonitrile are particularly preferred.

The reaction temperature for the copolymerization should be at or above the thermal decomposition temperature of the particular peroxy di-ester polyol employed. Such temperature normally will range from about 70° C. to about 150° C. and preferably about 80° C. to 110° C. In effecting the reaction, the presence of a free radical catalyst is not required for the copolymerization reaction, since the peroxy linkage within the chain of the polyol ester itself is broken at the reaction temperature and the free radicals formed serve as suitable initiators for polymerizing the monomer. Hence, grafting of the vinyl polymers directly onto the polyol chain itself at the site of the severed peroxy bond is accomplished. This eliminates dependency of grafting through hydrogen abstraction alone, which is much more random and indistinct than the direct method here provided.

As initially shown above, the grafting reaction may be illustrated by the following example, wherein $R_2$ and $((HO)_m-R_1-O)$ are as defined in Formula II above:

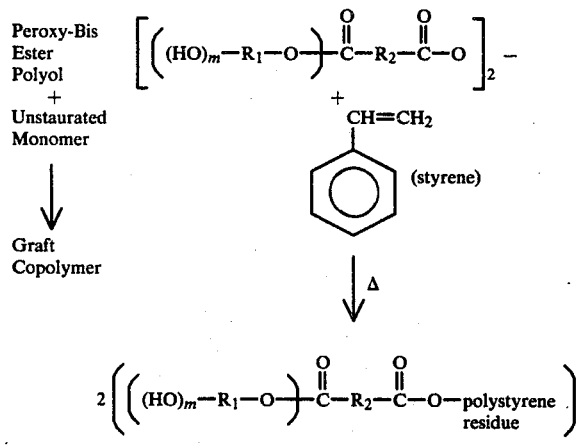

The amounts of the respective reactants in the graft copolymerization reaction determine the extent of copolymerized product present in the final graft copolymer dispersion. By varying the relative reactant proportions, a range of graft copolymerized products can be formed, which, in turn, can be utilized in formulations to produce various polyurethane properties.

The peroxy di-ester polyol may be reacted alone with unsaturated monomer, but, preferably it is supplemented with additional unesterified polyol, selected from the polyol reactants suitable for use in preparing the peroxy di-ester polyols. These polyols are further defined in co-pending application, Ser. No. 843,103, cited and incorporated hereinabove. The ratio of peroxy di-ester polyol to monomer in the copolymerization reaction can vary widely depending on the amount of copolymer required and the ensuing attendant polyurethane properties desired. From 0.01 to 100 percent of the peroxy di-ester polyol, based on the weight of total polyol, may be used. In forming the peroxy di-ester polyol reactant, it is advantageous to use excess polyol, which preferably is allowed to remain with the product to result in a peroxy di-ester polyol-unreacted polyol mixture. An advantageous reaction scheme is then to add monomer and the peroxy di-ester polyol-unesterified polyol mixture separately or combined to a heated reactor which contains additional unesterified polyol, in order to produce a graft copolymer of monomer and polyol dispersed in a polyol medium.

The amount of ethylenically unsaturated monomer used in the polymerization reaction preferably ranges from about 1 to 30 percent, and most preferably from about 3 to 25 percent, based on the weight of total polyols.

As stated earlier, the need for free radical catalyst is eliminated by utilizing the peroxy di-ester polyol of the present invention. When these peroxy-containing polyols are reacted with suitable vinyl monomers under proper conditions, the peroxy linkages are decomposed into free radicals at a rate suitable for polymerizing the vinyl monomers. Co-reaction and subsequent grafting can take place at the reactive broken linkage site provided on the polyol chain itself. This results in positive grafting of the unsaturated polymers on the polyol chain and circumvents dependency on less distinct grafting based only on hydrogen abstraction.

The graft copolymer dispersions of the present invention are particularly suited for use in polyurethane formulations, as shown in Examples X–XIV below. The presence of the multiple terminal hydroxyl groups allows the polyurethane-forming reaction with organic polyisocyanates. Modification of the amount of terminal hydroxyls causes variation of resulting physical properties of polyurethane products. The amount of branching and crosslinking is directly dependent on the number of hydroxyl groups in the original resin. Properties can be varied to form polyurethane products such as elastic fibers, elastomers, or flexible, semi-rigid, or rigid foams.

Although the invention is of utility in the preparation of non-cellular polyurethanes as well as polyurethane foams, the preparation of foams according to the invention is preferred.

In the preparation of the present polyurethane foams, either of the general forming processes, the "one-shot" or the "prepolymer" processes, may be utilized. Any combination of graft copolymer, additional polyol, organic polyisocyanate, foaming agent, catalyst, and other reactants capable of forming a polyurethane foam-forming reaction mixture can be employed.

The organic polyisocyanates used in the polyurethane foams of this invention include toluene diisocyanate, such as the 80:20 or the 65:35 isomer mixture of the 2,4- and 2,6-isomeric forms, ethylene diisocyanate, propylene diisocyanate, methylenebis-(4-phenyl isocyanate), 3,3'-bitoluene-4,4'-diisocyanate, hexamethylene diisocyanate, naphthalene 1,5-diisocyanate, the polymeric isocyanates such as polyphenylene polymethylene isocyanate, and the like, and mixtures thereof. The amount of isocyanate employed in the present process should generally be sufficient to provide at least about 0.7 NCO group per hydroxy group in the reaction system, which includes the graft copolymers, polyols, as well as any additional material and/or foaming agent present. In practice, polyisocyanate is usually used in a proportion to provide no more than about 1.25 NCO groups per each hydroxy group. A 100 multiple of the ratio of NCO to OH groups in the reaction system is referred to as the "index".

Any suitable foaming agent, or mixture of foaming agents may be employed. These include inorganic foaming agents, such as water, and organic foaming agents containing up to seven carbon atoms such as the halogenated hydrocarbons and the low molecular weight alkanes, alkenes, and ethers. Illustrative organic agents include monofluorotrichloromethane, dichlorofluoromethane, dichlorodifluoromethane, 1,1,2-trichloro-1,2,2,-trifluoroethane, methylene chloride, chloroform, carbon tetrachloride, methane, ethane, ethylene, propylene, hexane, ethyl ether, diisopropyl ether, mixtures thereof and the like. Water and the low molecular weight polyhalogenated alkanes, such as monofluorotrichloromethane and dichlorodifluoromethane, are preferred. The amount of foaming agent can be varied over a wide range, as is known in the prior art, depending on the density desired in the foam product.

The catalyst employed in preparing the foams of the invention may be any of the catalysts known to be useful for this purpose, including tertiary amines, organometallic salts, and mixtures of an organometallic salt with one or more tertiary amine, the latter being preferred. Typical tertiary amines include, for example, triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark "Niax A-1", methyldicyclohexylamine, N-cyclohexylmorpholine, dimethyldicyclohexylamine, methyldiethanolamine, mixtures of dimethylcyclohexylamine and 2-(3-pentyl)-1-dimethylaminocyclohexane such as may be purchased commercially under the trademark "Polycat", bis(dimethylaminoethylpropylether), mixtures of triethylene diamine and dipropylene glycol such as the 1:2 and 1:4 weight ratio mixtures which may be purchased commercially under the trademarks "Dabco 33-LV" and "Dabco 8020", respectively, bis(dimethylaminopropylether), and mixtures of these catalysts. The preferred tertiary amine catalysts are triethylene diamine, mixtures of triethylene diamine with dipropylene glycol, mixtures of bis(dimethylaminoethylether) and dipropylene glycol, dimethylcyclohexylamine alone or as a mixture thereof with 2-(3-pentyl)-dimethylaminocyclohexane. The tertiary amine catalyst is used in a proportion of about 0.1–1.5, and preferably about 0.25–0.75, parts per 100 parts by weight of the total polyol which is employed in preparing the foam.

Typical organometallic salts include, for example, the salts of tin, titanium, antimony, aluminum, cobalt, zinc, bismuth, lead, and cadmium, the tin salts, i.e., stannic and stannous salts, being preferred. Illustratively, such salts include the octoates, dilaurates, diacetate, dioctoates, oleates, and neodeconates of these metals, the octoates being preferred. The organomettalic salt catalyst is used in a proportion of about 0–0.5, and preferably about 0.05–0.2, parts per 100 parts by weight of total polyol which is employed in the preparation of the foam.

It is preferred in the preparation of the polyurethane foams of the invention to employ minor amounts of a conventional surfactant in order to further improve the cell structure of the polyurethane foam. Typical of such surfactants are the silicone oils and soaps, and the siloxane-oxyalkylene block copolymers. U.S. Pat. No. 2,834,748 and T. H. Ferrigno, *Rigid Plastic Foams* (New York: Reinhold Publishing Corp., 1963), pp. 34–42, disclose various surfactants which are useful for this purpose. A preferred group of surfactants are the polysiloxanes such as may be purchased under the trademark "Niax L-5303". Generally, up to two parts by weight of the surfactant are employed per 100 parts of total polyol.

The following examples are provided to further illustrate the invention. All parts and percentages are by weight unless otherwise specified.

Preparation of Polyether Polyol Reactants a. Polyether triol A was prepared from glycerol by base catalyzed block addition of propylene oxide capped with ethylene oxide such that the ethylene oxide content was approximately 9.8% and the primary hydroxyl content was approximately 55%. Final OH number was 37 mg KOH/g.

b. Polyether triol B was prepared from glycerol by base catalyzed random addition of propylene oxide and ethylene oxide such that the ethylene oxide content was approximately 5% and the primary hydroxyl content was approximately 0%. Final OH number was 56.

c. Polyether triol C was prepared from glycerol by base catalyzed block addition of propylene oxide capped with ethylene oxide such that the ethylene oxide content was approximately 11% and the primary hydroxyl content was approximately 55%. Final OH number was 56.

d. Polyether triol D was prepared from glycerol by base catalyzed block addition of propylene oxide capped with ethylene oxide such that the ethylene oxide content was approximately 15.7% and the primary hydroxyl content was approximately 70%. Final OH number 36.

Preparation of Peroxy-Bis Ester Polyols

EXAMPLE I 2.9 g of glutaric acid peroxide was mixed in a 500 ml three-neck flask with 250 g of polyol A. This is a 5:1 molar ratio of polyol to peroxy acid. The flask was fitted with an inlet sparge tube for gaseous HCl, a mechanical stirrer, a thermometer and an outlet tube for HCl, which was vented into a drain with constant water flow. The flask was heated by an oil bath to 40° C. and HCl flow begun. An exotherm was noted and the temperature rose to 50° C. where it was maintained with moderate HCl flow. After 45 minutes, the peroxy acid gradually dissolved and the clear solution was maintained at 50° C. for an additional 30 minutes.

Nitrogen gas was then passed through the sparge tube while maintaining temperature at 40–45° C. From time to time, the exit stream was tested with wet litmus paper to detect traces of HCl, however, a more sensitive indicator was odor. After three to four hours, HCl elimination was complete. A vacuum was then imposed on the system for 15 minutes to remove all gases from the system. A sample of peroxy-bis ester polyol A was withdrawn for various analyses.

| Gel Permeation Chromatography | OH No. mg KOH/g | Acid No. mg KOH/g |
|---|---|---|
| 74.0% 5100 (M.W.) | 30.1 | 0.81 |

| Gel Permeation Chromatography | OH No. mg KOH/g | Acid No. mg KOH/g |
|---|---|---|
| 25.9% 7800 (M.W.) | | |

EXAMPLE II

Polyol A was again reacted using the same general scheme as outlined above, employing however a 2.5:1 molar ratio of polyol to peroxy acid. Analyses of the final product yielded the following data:

| Gel Permeation Chromatography | OH No. mg KOH/g | Acid No. mg KOH/g |
|---|---|---|
| 72.8% 5100 (M.W.) | 23.2 | 4.18 |
| 27.2% 7500 (M.W.) | | |

EXAMPLE III

Polyol B was reacted using the same general scheme as outlined above. A 2.5:1 molar ratio of polyol to peroxy acid was used. Analyses of the final product yielded the following data:

| Gel Permeation Chromatography | OH No. mg KOH/g | Acid No. mg KOH/g |
|---|---|---|
| 58.3% ~ 2800 (M.W.) | 27.6 | 5.74 |
| 41.7% ~ 5500 (M.W.) | | |

EXAMPLE IV

Polyol C was reacted using the same general scheme as outlined above. A 2.5:1 molar ratio of polyol to peroxy acid was used. Analyses of the final product yielded the following data:

| Gel Permeation Chromatogrphy | OH No. mg KOH/g | Acid No. mg KOH/g |
|---|---|---|
| 26.3% ~ 2500 (M.W.) | 23.6 | 2.71 |
| 73.7% ~ 7700 (M.W.) | | |

Preparation of Graft Copolymers and Polyurethane Products Therefrom

EXAMPLES V-IX

A three-neck 1000 ml flask equipped with thermometer, stirrer, condenser and feed inlet port was used as a reactor vessel. Polyether triol A, described above, was weighed into the reactor and heated under a nitrogen atmosphere to the reaction temperature. A sample of peroxy-bis ester polyol, dissolved in acrylonitrile and/or styrene, was then added at a steady rate maintaining the temperature at 100° C., during reaction and for a post reaction period thereafter. Any residual volatile material was stripped at less than 1 mm Hg pressure at 100° C. The resultant opaque polyvinyl graft polyol was then tested for a Brookfield viscosity at 22° C. The data from each run is tabulated in Table I below.

Hand mix flexible urethane foams were prepared by a method common to the art using the formulation outlined in Table II below. Physical properties of the resulting foams appear in Table III below.

TABLE 1
PREPARATION OF GRAFT COPOLYMERS

| | EX. V | EX. VI | EX. VII | EX. VIII | EX. IX |
|---|---|---|---|---|---|
| Initial Reactor Content | | | | | |
| Polyol A, gm. | 390 | 110 | 230 | 230 | 210 |
| Feed | | | | | |
| Peroxy-Bis Ester Polyol, Ex. II | 60 | — | 120 | 120 | — |
| Peroxy-Bis Ester Polyol, Ex. I | — | 240 | — | — | 240 |
| Acrylonitrile, gm. | 50 | 120 | 120 | 50 | 50 |
| Styrene, gm. | — | 40 | 40 | — | — |
| Process Conditions | | | | | |
| Reaction Temperature, °C. | 100 | 100 | 100 | 100 | 100 |
| Feed Time, hours | 2.7 | 4 | 4.5 | 3 | 6 |
| Feed Rate, gm./min. | 0.7 | 1.7 | 1.04 | 0.9 | 0.8 |
| Post Reaction Time, hours | 2 | 1 | 1 | 2 | 2 |
| Stripping Time, hours | 1 | 1 | 1 | 1 | 1 |
| Results | | | | | |
| Product Appearance | Opaque ————————————→ | | | | |
| Viscosity, at 22° C. | 3000 | 4150 | 3300 | 6940 | 7600 |

TABLE 2
PREPARATON OF POLYURETHANE FOAMS

| | EX. X | XI | XII | XIII | XIV |
|---|---|---|---|---|---|
| Polyol D, gm. | 80 | 80 | 80 | 80 | 80 |
| Graft Copolymer of | | | | | |
| Example V, gm. | 20 | — | — | — | — |
| Example VI, gm. | — | 20 | — | — | — |
| Example VII, gm. | — | — | 20 | — | — |
| Example VIII, gm. | — | — | — | 20 | — |
| Example IX, gm. | — | — | — | — | 20 |
| Triethylene Diamine[1], gm. | 0.4 | 0.4 | 0.4 | 0.4 | 0.4 |
| Diethanolamine, gm. | 0.8 | 0.8 | 0.8 | 0.8 | 0.8 |
| Dibutyl Tin Dilaurate, gm. | 0.1 | 0.1 | 0.1 | 0.1 | 0.1 |
| Surfactant[2], gm. | — | 1.0 | 1.0 | 1.0 | 1.0 |
| Surfactant[3], gm. | 1.0 | — | — | — | — |
| Water, gm. | 2 | 2 | 2 | 2 | 2 |
| TDI-80[4] Index | 109 | 109 | 109 | 109 | 109 |
| Foam Processing | | | | | |
| Gel Time, sec. | 102 | 100 | 100 | 100 | 100 |
| Cure Times, min. at 100° C. | 10 | 10 | 10 | 10 | 10 |
| Shrinking | None | None | None | None | None |

[1]This is a commercially available product sold under the trademark "Dabco 33 LV". It consists primarily of triethylene diamine (1/3) and dipropylene glycol (2/3).
[2]This is a commercially available polysiloxane surfactant sold under the trademark "Niax L-5303".
[3]This is a commercially available polysiloxane surfactant sold under the trade name "Dow Corning Q2-5043".
[4]This is a mixture of toluene diisocyanate isomers (80/20 mixture of 2,4/2,6-isomers).

TABLE 3
FOAM PHYSICAL PROPERTIES

| | EX. X | XI | XII | XII | XIV |
|---|---|---|---|---|---|
| ILD[5], 4" 25% | 21.4 | 27.5 | 28.1 | 22.8 | 24.6 |
| 65% | 50.6 | 65.8 | 65.8 | 54.4 | 58 |
| Sag Factor[6] | 2.36 | 2.39 | 2.34 | 2.39 | 2.36 |
| Tear, pli[7] | 1.04 | 1.15 | 0.99 | 1.10 | 1.11 |
| Tensile, psi[8] | 8.1 | 11.7 | 11.1 | 8.8 | 9.4 |
| Compression Set[9], | | | | | |
| 75% C(T) | 3.8 | 4 | 3.5 | 3.6 | 4.3 |
| C(D) | 5.2 | 5.4 | 4.8 | 4.8 | 5.7 |
| Steam Autoclave[10], Compression Sets, | | | | | |
| 75% C(T) | 13.3 | 13.4 | 13.8 | 16.1 | 15.9 |
| C (D) | 17.6 | 17.9 | 18.7 | 21.4 | 20.9 |
| Ball Rebound[11] | 62.6 | 60.6 | 61 | 63.2 | 62 |
| Air Flow, cfm[12] | 2.9 | 1.4 | 1.3 | 2 | 1.8 |
| Density, pcf[13] | 2.69 | 2.83 | 2.72 | 2.73 | 2.76 |

TABLE 3-continued

| FOAM PHYSICAL PROPERTIES | | | | | |
|---|---|---|---|---|---|
| | EX. X | XI | XII | XII | XIV |
| Elongation, %[14] | 127 | 163 | 130 | 130 | 157 |

[5]Indentation Load Deflection (lbs.) per ASTM D-1564-64.
[6]Sag factor, a measure of the support of cushioning material is expressed as a ratio of 65% ILD to 25% ILD.
[7]Lbs. per linear inch per ASTM 1564-64.
[8]Lbs. per square inch per ASTM 1564-64.
[9]Per ASTM D-1564-71.
[10]Compression set after steam aging per ASTM D-1564-71.
[11]Percentage per ASTM D-1564-64T.
[12]Cubic feet per minute per Nopco Air Picnometer Flow Test.
[13]Lbs. per cubic foot per ASTM 1564-64.
[14]Percent per ASTM 1564-64.

We claim:

1. In a process for the preparation of graft copolymer polyols which comprises polymerizing an ethylenically unsaturated monomer or mixtures of such monomers in a polyol, the improvement characterized by polymerizing the unsaturated monomer in a polyol comprising a peroxy di-ester polyol of the formula:

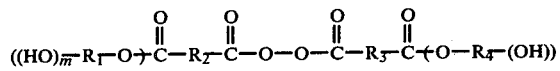

wherein m and r independently represent integers from 1-5, $R_2$ and $R_3$ independently represent radicals selected from aryl and alkenyl of 2-5 carbon atoms, and $((HO)_m—R_1—O)$ and $(O—R_4—(OH)_r)$ independently represent residues of polyols $R_1(OH)_{m+1}$ and $R_4(OH)_{r+1}$, wherein $R_1$ and $R_4$ independently represent polyether or polyester chains, having an average equivalent weight ranging from about 250 to 5000, after removal of one hydroxy hydrogen therefrom; said polymerizing occurring at a temperature at or above which the peroxy linkages of the peroxy di-ester polyol are ruptured.

2. The process of claim 1 comprising the polymerizing of unsaturated monomer in a polyol comprising the peroxy di-ester polyol and additional polyol medium.

3. The process of claim 1 wherein the monomer is selected from the group consisting of styrene, acylonitrile and mixtures thereof.

4. The process of claim 1 wherein the monomer ranges in amount from about 1 to 30 percent based on total polyol weight.

5. The process of claim 1 wherein $((HO)_m—R_1—O)$ and $(O—R_4—(OH)_r)$ of the peroxy di-ester polyol formula individually represent residues of polyether polyols $R_1(OH)_{m+1}$ and $R_4(OH)_{r+1}$ after removal of one hydroxy hydrogen therefrom.

6. The process of claim 5 wherein the polyether polyols are polyether triols having an average equivalent weight ranging from about 700 to 3000.

7. The process of claim 5 wherein the polyether polyols are polyether triols having an average equivalent weight ranging from about 1000 to 1500.

8. The process of claim 1 wherein m and r, $R_2$ and $R_3$, and $((HO)_m—R_1—O)$ and $(O—R_4—(OH)_r)$ of the peroxy di-ester polyol formula respectively represent the same entities, such that the formula represents a symmetrical peroxy-bis ester polyol.

9. The process of claim 8 wherein the monomer is selected from the group consisting of styrene, acrylonitrile and mixtures thereof.

10. The process of claim 9 wherein the monomer ranges in amount from 1 to 30 percent based on total polyol weight.

11. The process of claim 10 wherein $((HO)_m—R_1—O)$ and $(O—R_4—(OH)_r)$ of the peroxy-bis ester polyol formula represent a residue of a polyether polyol.

12. The process of claim 11 wherein the polyether polyol is a polyether triol having an average equivalent weight between about 700 to 3000.

13. The process of claim 12 wherein the polymerizing of unsaturated monomer in the peroxy-bis ester polyol is conducted in a medium of an additional polyether triol having an average equivalent weight between about 700 to 3000.

14. The process of claim 12 wherein the polyether polyol is a polyether triol having an average equivalent weight between about 1000 to 1500.

15. The process of claim 8 wherein the peroxy-bis ester polyol is characterized by the formula:

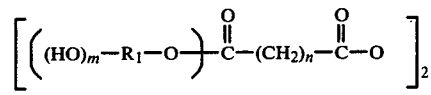

wherein m represents an integer from 1-5, $((HO)_m—R_1—O)$ represents a residue of a polyether polyol $R_1(OH)_{m+1}$ after removal of one hydroxy hydrogen therefrom, and n represents an integer from 2-4; said polymerizing occurring at a temperature from about 70° C. to 150° C.

16. The process of claim 14 wherein the peroxy-bis ester polyol is characterized by the formula:

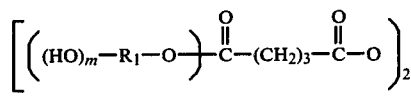

wherein m represents the integer 2, and $((HO)_m—R_1—O)$ represents a residue of a polyether triol having an equivalent weight between about 1000 and 1500 after removal of one hydroxy hydrogen therefrom.

17. A graft copolymer prepared according to the process of claim 1.

18. A graft copolymer dispersion prepared according to the process of claim 1.

19. A graft copolymer dispersion prepared according to the process of claim 2.

20. A graft copolymer dispersion prepared according to the process of claim 8.

21. A graft copolymer dispersion prepared according to the process of claim 15.

22. A graft copolymer dispersion prepared according to the process of claim 16.

* * * * *

UNITED STATES PATENT AND TRADEMARK OFFICE
CERTIFICATE OF CORRECTION

PATENT NO. : 4,153,643
DATED : May 8, 1979
INVENTOR(S) : Frank J. Preston, Theodore C. Kraus and Kiran B. Chandalia It is certified that error appears in the above-identified patent and that said Letters Patent are hereby corrected as shown below:

Column 4, line 20, " $>C=C<$ " should read -- $>C=C<$ --.

Column 11, claim 1, between lines 23-25, the formula should read

Column 12, claim 16, between lines 40-43, the formula should read

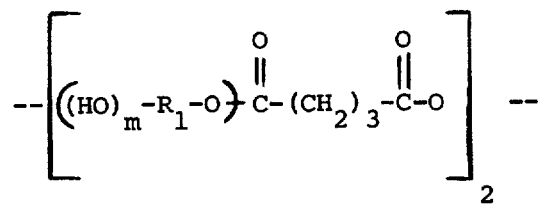

Signed and Sealed this

Eighteenth Day of December 1979

[SEAL]

Attest:

SIDNEY A. DIAMOND

Attesting Officer   Commissioner of Patents and Trademarks